July 3, 1928.                                     1,675,317
R. F. BURKE
TRUCK BODY CONSTRUCTION
Filed Aug. 24, 1925          3 Sheets-Sheet 3
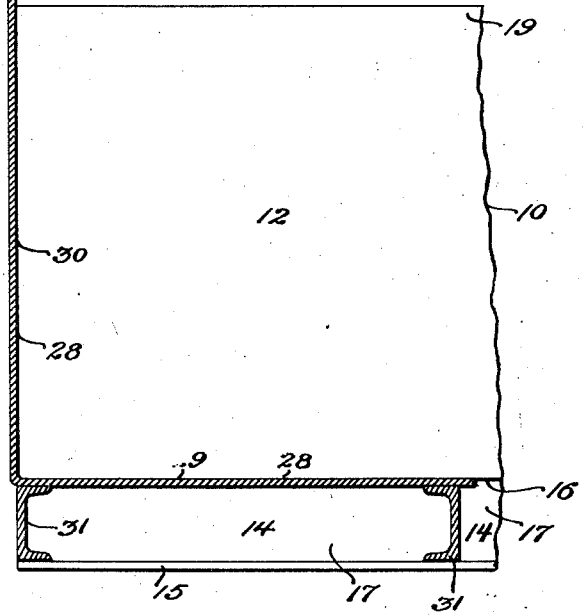
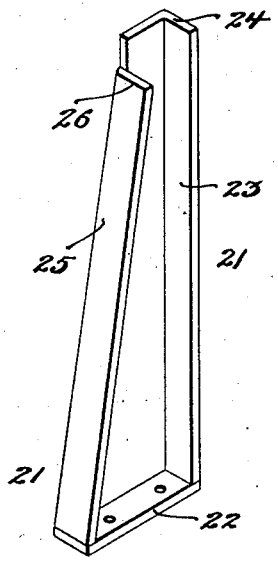
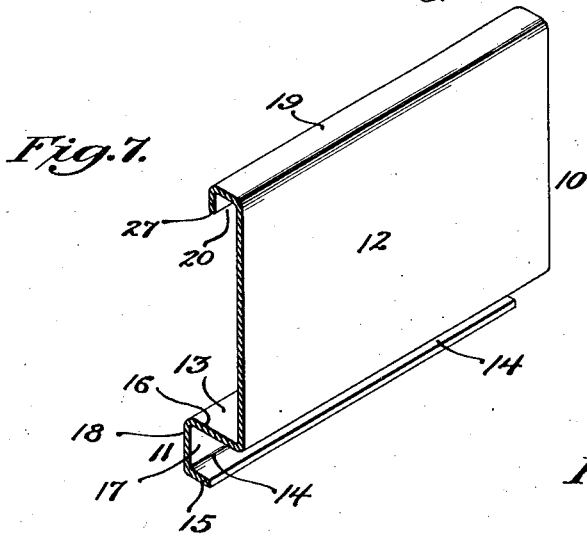
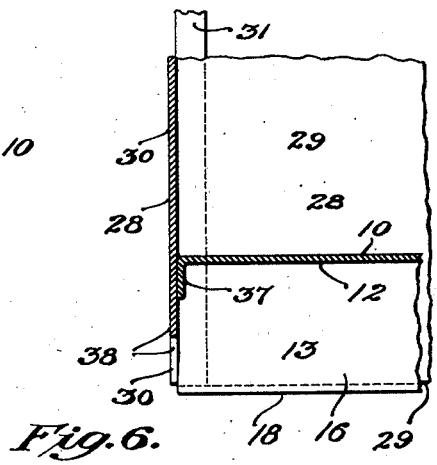
Witnesses,
Rae Newmark
Arthur B. Fraser
Inventor
Robert F. Burke
by Augustus B. Copper
his Attorney.

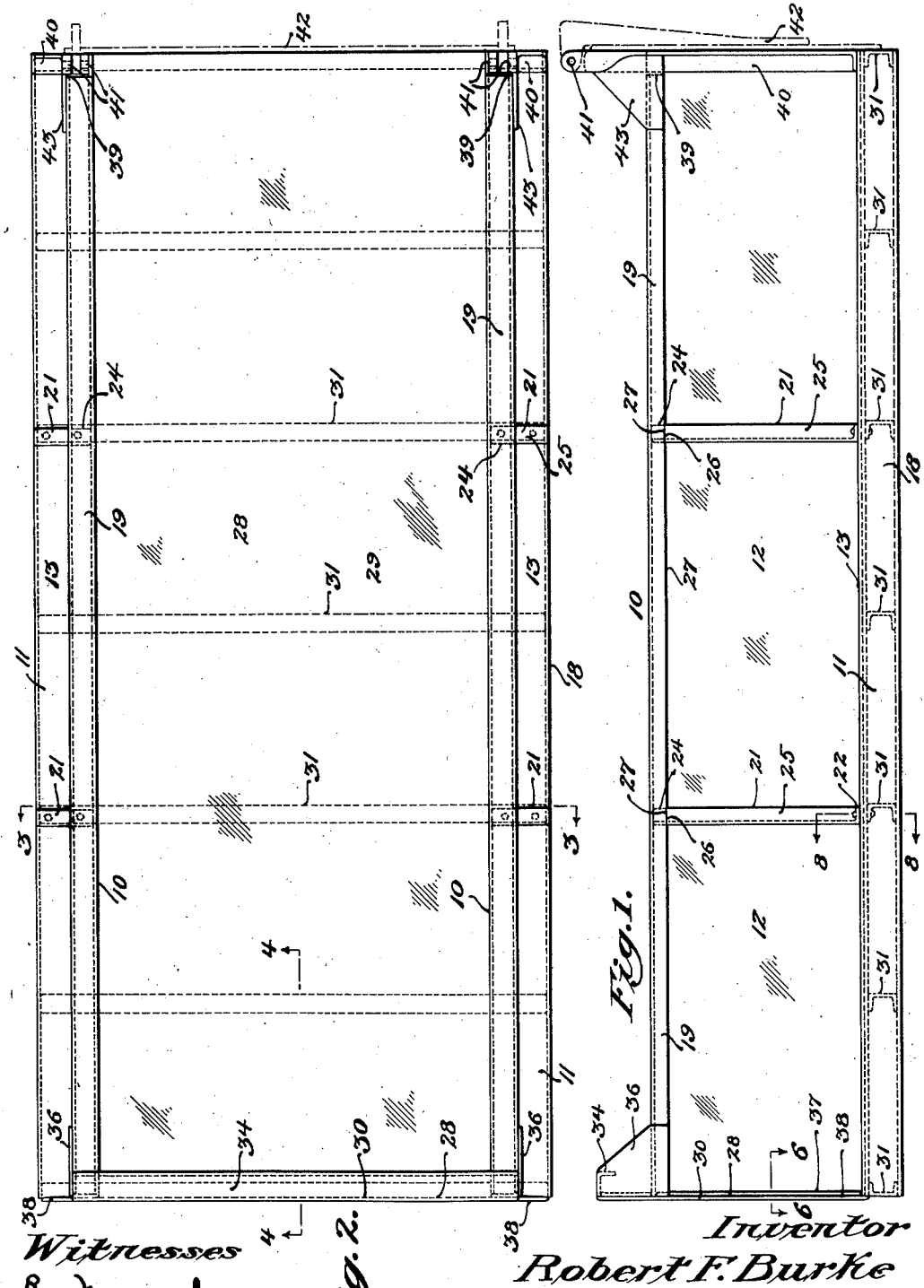

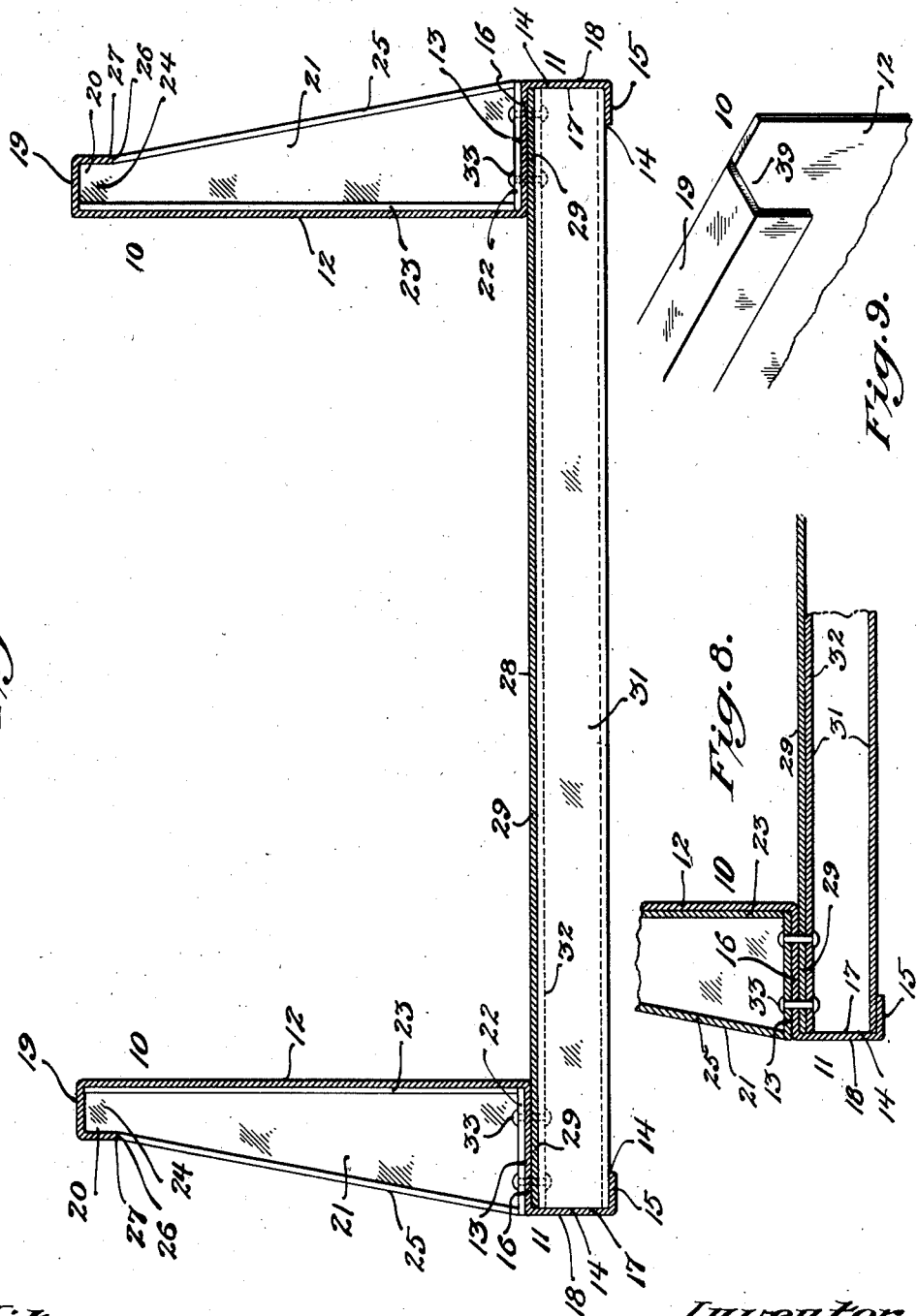

Patented July 3, 1928.

1,675,317

UNITED STATES PATENT OFFICE.

ROBERT F. BURKE, OF PHOENIXVILLE, PENNSYLVANIA, ASSIGNOR TO HEINE BOILER COMPANY, OF ST. LOUIS, MISSOURI, A CORPORATION OF MISSOURI.

TRUCK-BODY CONSTRUCTION.

Application filed August 24, 1925. Serial No. 52,013.

One object of my invention is to provide an exceptionally strong, durable and serviceable vehicle truck body which can be readily and economically manufactured.

Another object is to so make my improved truck body that even though comparatively thin sheet metal is used to make the sides, front and bottom, they will be exceptionally strong and durable, and furthermore, the body will not be unduly heavy.

In making the sides of my improved truck body, I preferably use sheet metal and bend it into a novel shape. Said shape not only adds great strength to the sides, but also allows the bottom plate portion with transverse reinforcing and supporting beams to be readily positioned and secured. The shapes of the parts are such as to allow workmen to easily and quickly place and secure said parts in position; no great care or skill being required on the part of the workmen.

Furthermore, I preferably make the bottom plate portion and the upright front portion of a single sheet of metal which is bent in a novel manner and coactive with the sides to provide a secure connection.

The above mentioned objects and other advantageous ends which will be set forth hereinafter, I attain in the following manner, reference being had to the accompanying drawings, in which Figure 1 is a side elevation of a vehicle truck body made in accordance with my invention, Figure 2 is a top plan view of the truck body shown in Figure 1, Figure 3 is an enlarged transverse sectional elevation taken on the line 3—3 of Figure 2, Figure 4 is an enlarged fragmentary sectional elevation taken on the line 4—4 of Figure 2, Figure 5 is a perspective view of one of a number of side braces which I preferably employ, Figure 6 is an enlarged fragmentary sectional plan view taken on the line 6—6 of Figure 1, Figure 7 is a perspective view illustrating a portion of one of the sides of the truck body, Figure 8 is an enlarged fragmentary sectional elevation taken on the line 8—8 of Figure 1, and Figure 9 is a fragmentary perspective view showing the rear end portion of one of the truck sides.

Referring to the drawings, 10 represents the two sides of my improved truck body which are preferably made of sheet metal bent throughout their lengths to provide lateral bulged portions 11 which extend outwardly from the bottoms of the upright portions 12 of said sides.

The bulged portions 11 have top surfaces 13 providing ledges for the support and attachment of braces hereinafter more specifically described. The portions 11 are preferably made angular in cross section, as illustrated, and provide channels or grooves 14 by their inner surfaces. The bottoms of the channels 14 are formed by inwardly extending flanges 15 of the bulged portions 11 which are spaced below the top portions 16, the top portions 16 also providing the ledges 13 previously mentioned. The innermost walls 17 of the channels 14 are produced by the upright parts 18 of the bulged portions 11 which join the parts 16 and flanges 15.

The top parts 19 of the portions 12 are bent outwardly and downwardly to provide channels 20 which are open at their bottoms as clearly shown in Figures 3 and 7 of the drawings.

I preferably provide a number of braces 21, one of which is shown in perspective view in Figure 5. These braces have flanged bases 22 which rest upon the ledges 13, the upright flange portions 23 extending upward against the outer surfaces of the portions 12 of the truck body sides 10, the upper ends 24 of the braces 21 extending into the top channels 20. The outer inclined flanges 25 of the braces 21 are preferably cut away at their tops 26 so as to be flush with the bottom edges 27 of the top portions 19, as clearly shown in Figures 1, 3 and 5.

A metal plate 28 is bent within its length to provide a bottom or floor portion 29 and an upright or front portion 30. The opposite edges of the floor or bottom portion 29 extend under the parts 16 of the bulged portions 11 and within the opposed channels 14. Supporting beams 31 extend in spaced distances apart under the bottom or floor portion 29 of the plate 28 and the opposite ends of said beams 31 are located within the channels 14. Any desired number of beams 31 can be employed, but I preferably arrange said beams in such manner that a beam is located below each brace 21 so that I may connect the bases 22 of the braces 21 with the flanges 32 of the supporting beams 31 by rivets 33, the rivets also passing through the portions 16 and plate portion 29 as clearly shown in Figures 3 and 8. By making the flanges 15 of the bulged portions 11 of less width than the portions 16, tool room is provided for the workmen to readily allow the riveting or for any other purpose and also to facilitate the connection of the various portions. The flanges 32 of the beams 31 which are under the braces 21 are preferably positioned counter to the base flanges 22 of the braces 21 as clearly illustrated in Figure 1. The top portion 34 of the front 30 is preferably bent inwardly and downwardly, as clearly shown in Figures 1 and 4, so that a reinforcing channel portion 35 is produced, and end or cap plates 36 are secured by electro-welding or other means to the ends of the portion 34 and to the outer surfaces of the top portions 19 of the sides 10.

The extreme front ends of the sides 10 have outwardly bent flanges 37 which are secured by electro-welding or other means to the parts 38 of the front 30, said parts 38 being the extended edge portions of the front 30 which project outwardly beyond the portions 12 of the sides 10, it being noted that the plate 28 extends within the channels 14 throughout the lengths thereof so that the parts 38 actually form lateral braces at the extreme front of the truck body.

The top portions 19 of the sides 10 are preferably cut away or discontinued at the rear ends of the truck sides, as shown at 39, to allow rear braces 40 to project upwardly to positions above the level of the top portions 19 as clearly shown in Figures 1 and 2, said cutaway portion being illustrated in Figure 9. The tops of the braces 40 provide pivot connections 41 for a tail board 42, the latter being illustrated in dot-and-dash lines. Side plates 43 are secured to the outer surfaces of the portions 19 and confine the braces 40, the bases of the latter resting upon and being secured to the ledges 13. The upper ends of the braces 21 can be electro-welded or otherwise suitably secured within the channels 20 and the flanges 23 can also be electro-welded to the upright portions 12. The beams 31 can be electro-welded to the flanges 15.

By the above construction and shaping of the parts, it will be noted that the bending of the sides 10 not only greatly strengthens them, but allows the bottom or floor portion with the supporting and reinforcing beams to be easily slipped and fitted within the channels 14 and the parts secured together. Furthermore, this fitting of the parts within the channel strengthens the bottom portions of the sides 10 and also directly assists in adding strength to the braces 21. While I prefer to employ the riveting as above described, it will be understood that any suitable means can be employed for connecting the various parts in their operative positions.

Having thus described my invention what I claim as new and desire to secure by Letters Patent is:

1. A truck body including sides having upright portions with lower outwardly bulged portions providing opposed channels; and a plate having opposite edge portions housed within said channels to provide a floor, portions of said plate, from the parts within said channels, being bent upward in front of the forward ends of said bulged portions and extending transversely thereof to provide a front for the body.

2. A truck body including sides having upright portions with lower integral bulged portions bent outwardly to provide opposed channels; and a plate having opposite edge portions housed within said channels, said plate having an integral portion bent upwardly in front of the forward edges of said sides to provide a front end closure.

3. A truck body including sides bent to provide lateral bulged portions forming ledges, the tops of said sides being bent to form channels; and braces mounted on said ledges, said top portions of the sides being cut away adjacent their rear to allow portions of said braces to project upwardly therethrough, said portions of the braces having parts providing pivot connections for attachment of a tail board.

In testimony whereof I have signed my name to this specification.

ROBERT F. BURKE.